UNITED STATES PATENT OFFICE 2,455,894

PRODUCTION OF 1-MONO- AND 1,2-DISUBSTITUTED-3-CYANOGUANIDINES

Hans Z. Lecher, Plainfield, Robert Prescott Parker, Somerville, and Robert Sidney Long, Plainfield, N. J., assignors to American Cyanamid Company, New York, N. Y., a corporation of Maine No Drawing. Application August 8, 1946, Serial No. 689,202

9 Claims. (Cl. 260—551)

This invention relates to guanidine derivatives. More specifically, it relates to a new process for preparing 1,2-disubstituted- and 1-mono-substituted-3-cyanoguanidines which may be represented generically by the following formula

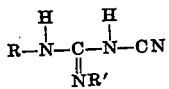

wherein R is selected from the class consisting of hydrocarbon and halo-aryl groups and R' is selected from the class consisting of hydrogen and hydrocarbon groups.

According to the present invention, 1,2-disubstituted-3-cyanoguanidines and 1-monosubstituted-3-cyanoguanidines are prepared by reacting a correspondingly N,N'-disubstituted thiourea and a correspondingly N-monosubstituted thiourea, respectively, with a cyanamide and a dethionating agent. Such dethionating agents may be the oxides or salts of such metals as lead, silver, mercury, and the like, which have a great affinity for sulfur and are therefore capable of removing the sulfur atom from the thiourea molecule with the formation of a metallic sulfide. While other metals have a strong affinity for sulfur, the aforementioned mercury, lead and silver have a particularly great affinity for sulfur as is evidenced by the fact that they form insoluble sulfides which are not decomposed by aqueous acids. The cyanamide reactants which may be employed in this process in addition to cyanamide itself are the cyanamide salts of metals such as those of sodium, potassium, calcium and the like. Obviously, the cyanamide reactant is combined with the dethionating agent when such cyanamide salts as those of lead, mercury, silver and the like are employed and it will be understood that their use is within the contemplated scope of the invention.

One method by which the reaction may be carried out involves reacting the thiourea with a cyanamide salt of one of the aforementioned dethionating agents. The general reaction is shown in Equation 1

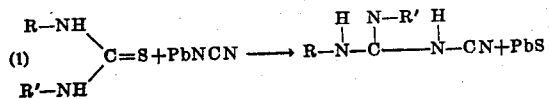

where R stands for aromatic, aliphatic, alicyclic, aralkyl and heterocyclic radicals, and R' stands for hydrogen, and aromatic, aliphatic, alicyclic, aralkyl and heterocyclic radicals. Lead cyanamide is used here only as an example and other cyanamide salts of dethionating metals, such as those of mercury, silver and the like, may be used.

Another method whereby the 3-cyanoguanidines of the present invention may be prepared consists in dethionating the thiourea with a dethionating agent such as those aforementioned in the presence of a cyanamide. This reaction is shown in Equation 2

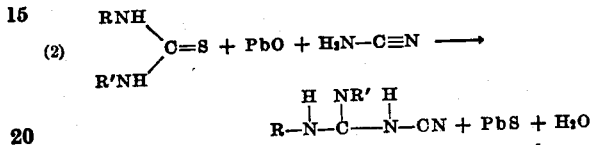

where R and R' have the meanings given above. Lead oxide is used here only as an example, and other dethionating agents may be employed instead.

Among the dethionating agents, lead, silver and mercury compounds are preferred, as aforementioned, the use of their basic and neutral compounds such as salts and oxides being still more preferable. Because of their ready availability, low cost and the effectiveness of their action the lead compounds are greatly preferred over the other dethionating agents, lead cyanamide, lead oxide, and basic lead carbonate being the preferred specific compounds.

The substituent radicals, R and R', of the thioureas and 3-cyanoguanidines may be, as aforementioned, aliphatic, aromatic, alicyclic, aralkyl, or heterocyclic, and may be saturated or unsaturated. Examples of such radicals are methyl, ethyl, propyl, isopropyl, isobutyl, butyl, octyl, dodecyl, octadecyl, allyl, vinyl, phenyl, tolyl, xylyl, naphthyl, biphenylyl, benzyl, cyclohexyl, pyridyl, piperidyl, furfuryl and the like. The thioureas may be substituted by the same or different radicals. Examples of these compounds are s-dimethylthiourea, N-methyl-N'-ethylthiourea, s-diethylthiourea, s-dipropylthiourea, s-dibutylthiourea, s-didodecylthiourea, s-dioctadecylthiourea, s-diphenylthiourea, N - p - anisyl-N'-allylthiourea, N-p-nitrophenyl-N'-p-cyanophenylthiourea, s-diallylthiourea, s-di-o-tolylthiourea, s-di-p-xylylthiourea, N-methyl - N' - phenylthiourea, N-phenyl-N'-o-tolylthiourea, N-phenyl-N'-dodecylthiourea, s - dibenzylthiourea, s - dicyclohexylthiourea, N-isopropyl - N' - p-chlorophenylthiourea, N-α-naphthyl-N'-γ-methoxypropylthiourea, N-phenyl-N'-α-pyridyl, N-phenylthiourea, N-p-chlorophenylthiourea, N -isopropylthiourea, N-p-nitrophenylthiourea, and N-p-cyanophenylthiourea.

While the reaction may be carried out in the presence of any of a large number of organic solvents or diluents so long as they are essentially inert under the conditions of reaction, it is advantageous to employ alcohols wherever possible since their use generally permits greater ease in isolating the final product. However, other solvents such as ethers, ketones, aromatic hydrocarbons, and the like, may also be employed and in some specific cases are preferable.

The temperature for suitable reaction is varied according to the specific thiourea used. Thus, in the lower aliphatic substituted thiourea series the reaction occurs readily at room temperature, while thioureas containing higher aliphatic radicals require the temperature of higher boiling solvents, such as butyl alcohol or toluene.

Upon completion of the reaction, the metal sulfide formed in the reaction is removed, usually by filtration. In some cases the 3-cyanoguanidine may be isolated by cooling the filtrate, whereupon the 3-cyanoguanidine crystallizes and may be separated by filtering. In other cases, dilution of the filtrate with water serves to precipitate the 3-cyanoguanidine which may be recovered by filtration. In other preparations, the 3-cyanoguanidines may possess a high solubility so that the product may be recovered only by removing the solvent through evaporation.

The main advantage of the new process is to make a large number of 3-cyanoguanidines easily accessible. Since N-monosubstituted and N,N'-disubstituted thioureas are easily accessible, the process uses inexpensive and readily available raw materials. Its operation is simple and the yields are, in most cases, very good.

The 1,2-disubstituted-3-cyanoguanides of this invention are valuable organic intermediates whose principal uses are in the fields of synthetic resins, pharmaceuticals, textile assistants, and dyestuff assistants.

The following specific examples will serve to describe in greater detail the process of the present invention. It will be understood that the examples are typical of the present invention, but are not intended to limit it in any manner. In these examples, the parts given are parts by weight.

EXAMPLE 1

1,2-diethyl-3-cyanoguanidine

A. A solution of 13.2 parts of symmetrical diethylthiourea in 145 parts of diethyl ether is stirred and treated with 22 parts of anhydrous sodium sulfate and 43.2 parts of mercuric oxide. While this mixture is stirred, a solution of 4.4 parts of cyanamide dissolved in 29 parts of diethyl ether is carefully added. The reaction mixture is stirred at room temperature until a small filtered portion is not discolored when treated with fresh mercuric oxide. The black mercuric sulfide is separated by filtration and the product is recovered by evaporation. Crude 1,2-diethyl-3-cyanoguanidine is purified by crystallization from water, and the pure compound melts at 129°–129.2° C.

Other solvents, such as alcohols and the like, may be used in this reaction and other dethionating agents, such as, basic lead carbonate may be employed.

B. A solution of 13.2 parts of symmetrical diethylthiourea in 98 parts of ethanol is treated with 27.9 parts of lead cyanamide with stirring at the reflux temperature until a clarified portion of the solution shows no discoloration when treated with yellow mercuric oxide. The black lead sulfide is separated by filtration, and the 1,2-diethyl-3-cyanoguanidine is recovered by evaporation of the filtrate. This crude product is also purified by recrystallization from water, and has the melting point reported in Example 1A.

EXAMPLE 2

1,2-dimethyl-3-cyanoguanidine 26.0 parts of lead cyanamide, 10.4 parts of symmetrical dimethylthiourea and 100 parts of methanol are stirred at 65° C. until a clarified portion of the reaction mixture does not discolor when treated with a small amount of yellow mercuric oxide. The lead sulfide is removed by filtration and the 1,2-dimethyl-3-cyanoguanidine is recovered by evaporation of the methanol. After recrystallization from water, the pure material melts at 174.5°–174.8° C.

EXAMPLE 3

1,2-diphenyl-3-cyanoguanidine

A. 26.0 parts of lead cyanamide and a solution of 22.8 parts of symmetrical diphenylthiourea in 100 parts of absolute ethanol are stirred at refluxing temperature until a clarified portion of the solution shows no discoloration when treated with yellow mercuric oxide. The black lead sulfide is separated by filtration and the filtrate is chilled. 1,2-diphenyl-3-cyanoguanidine crystallizes from this solution. An additional amount of this material may be obtained by extracting the lead sulfide residue with the alcoholic mother liquor at elevated temperatures. When recrystallized from alcohol, the purified 1,2-diphenyl-3-cyanoguanidine melts at 195°–195.8° C.

B. A mixture of 22.8 parts of symmetrical diphenylthiourea and 26.0 parts of lead cyanamide in 100 parts of benzene is heated on a steam bath for 1 hour. An additional 5.2 parts of lead cyanamide are added and the heating is continued for an additional hour. The hot reaction mixture is filtered and the filtrate is chilled. 1,2-diphenyl-3-cyanoguanidine crystallizes from this solution and is isolated by filtration.

Substitution of acetone for the benzene in the above reaction produces 1,2-diphenyl-3-cyanoguanidine with essentially the same results. After purification, the material prepared according to the above procedures melts at the same temperature as that obtained in Example 3A.

EXAMPLE 4

1,2-di-o-tolyl-3-cyanoguanidine 26.3 parts of lead cyanamide and a solution of 24.6 parts of symmetrical di-o-tolylthiourea in 118 parts of absolute ethanol are stirred and refluxed until a clarified test portion of the solution shows no discoloration when treated with yellow mercuric oxide. The black lead sulfide is separated by filtration, and the 1,2-di-o-tolyl-3-cyanoguanidine is recovered by chilling the solution and filtering off the resulting crystals. An additional quantity of product may be obtained by extracting the lead sulfide cake with the alcoholic mother liquor at elevated temperatures. After recrystallization from alcohol, the pure 1,2-di-o-tolyl-3-cyanoguanidine melts at 210.5°–211° C.

EXAMPLE 5

1-butyl-2-phenyl-3-cyanoguanidine 27.3 parts of lead cyanamide and the solution of 20.8 parts of N-butyl-N'-phenylthiourea in 158 parts of ethanol are mixed and stirred at the reflux temperature until a clarified test portion of the solution shows no discoloration after treatment with yellow mercuric oxide. The lead sulfide is filtered off and the 1-butyl-2-phenyl-3-cyanoguanidine is recovered by evaporation of the alcohol. After recrystallization from benzene, the product melts at 114°–115° C.

EXAMPLE 6

1,2-dibutyl-3-cyanoguanidine 27.5 parts of lead cyanamide and the solution of 18.8 parts of symmetrical dibutylthiourea in 118 parts of ethanol are mixed and stirred at the reflux temperature until a clarified test portion shows no discoloration when treated with yellow mercuric oxide. The lead sulfide is separated by filtration, and the crude 1,2-dibutyl-3-cyanoguanidine is recovered by evaporating the alcohol. After recrystallization from dilute methanol, the crystalline product melts at 63.5°–64.5° C.

EXAMPLE 7

1,2-diallyl-3-cyanoguanidine

A mixture of 15.6 parts of symmetrical diallylthiourea, 29.7 parts of lead cyanamide and 100 parts of "Cellosolve" (mono ethyl ether of ethylene glycol) is heated under reflux with stirring for about 24 hours. The precipitated lead sulfide and unreacted lead cyanamide is removed by filtration and the "Cellosolve" is evaporated from the filtrate on the steam bath. The residue is a slightly viscous oil which is slurried in 100 parts of water and sufficient hydrochloric acid to give a positive test on Congo Red indicator paper. The aqueous slurry of the oil is extracted with benzene to remove a small amount of benzene insoluble oil which is discarded. The remaining water-insoluble oil is then extracted with chloroform. The chloroform is removed by evaporation on the steam bath and the residue is dried further in a vacuum oven at 50° C. It is a yellow oil which gives no test for diallylthiourea with mercuric oxide in ethyl alcohol and consists essentially of the desired 1,2-diallyl-3-cyanoguanidine.

EXAMPLE 8

1,2-didodecyl-3-cyanoguanidine 26.0 parts of lead cyanamide and 41.2 parts of symmetrical didodecylthiourea dissolved in 250 parts of butanol are mixed and stirred under reflux temperature until a clarified portion shows no discoloration when treated with yellow mercuric oxide. After filtering off the lead/oxide, the 1,2-didodecyl-3-cyanoguanidine is recovered by removing the butanol under reduced pressure. The product may be recrystallized from methyl alcohol.

EXAMPLE 9

1-isopropyl-2-p-chlorophenyl-3-cyanoguanidine

A mixture of 22.9 parts of N-isopropyl-N'-p-chlorophenylthiourea, 29.7 parts of lead cyanamide and 80 parts of absolute ethyl alcohol is heated under reflux with stirring for about 20 hours. The precipitated lead sulfide is removed by filtration and the desired 1-isopropyl-2-p-chlorophenyl-3-cyanoguanidine is recovered from the filtrate by the addition of 100 parts of 1N hydrochloric acid. When purified by recrystallization from ethyl alcohol it has a melting point of 148°–149.5° C.

EXAMPLE 10

1,2-dicyclohexyl-3-cyanoguanidine

A mixture of 24.0 parts of symmetrical dicyclohexylthiourea, 29.7 parts of lead cyanamide and 160 parts of absolute ethyl alcohol is heated under reflux for about 18 hours with stirring. To the reaction mixture is then added 5 g. of lead cyanamide and refluxing and stirring are continued for an additional 24 hours. The precipitated lead sulfide is removed by filtration and the product is isolated from the filtrate by the addition of 100 parts of 1N hydrochloric acid. This material is slightly impure 1,2-dicyclohexyl-3-cyanoguanidine, which may be recrystallized from ethyl alcohol or toluene to give a pure product having a melting point of 191°–192.6° C.

EXAMPLE 11

1-p-methoxyphenyl-2-allyl-3-cyanoguanidine

A mixture of 22.2 parts of N-p-methoxyphenyl-N'-allylthiourea, 29.7 parts of lead cyanamide and 160 parts of absolute ethyl alcohol is heated under reflux for 18 hours with stirring. To the reaction mixture is then added 5 parts of lead cyanamide and refluxing is continued for an additional 24 hours. The precipitated lead sulfide and unreacted lead cyanamide is removed from the reaction by filtration and the desired 1-p-methoxyphenyl-2-allyl-3-cyanoguanidine is recovered from the filtrate by the addition of about 500 parts of water and sufficient hydrochloric acid to render the solution acidic to Congo Red indicator paper. The material so obtained may be purified by recrystallization from ethyl alcohol or benzene, and when pure has a melting point of 129°–131.5° C.

EXAMPLE 12

1-α-naphthyl-2-γ-methoxypropyl-3-cyanoguanidine

A mixture of 27.4 parts of N-α-naphthyl-N'-γ-methoxypropylthiourea, 29.7 parts of lead cyanamide and 160 parts of absolute ethyl alcohol is heated under reflux with stirring for about 24 hours. The precipitated lead sulfide is removed by filtration of the hot reaction mixture and the product, 1-α-naphthyl-2-γ-methoxypropyl-3-cyanoguanidine, is isolated from the filtrate by cooling and filtering. Recrystallized from ethyl alcohol it has a melting point of 181°–182.5° C.

EXAMPLE 13

1-phenyl-3-cyanoguanidine

A mixture of 11.4 parts of N-phenylthiourea, 18.6 parts of lead cyanamide and 100 parts of absolute ethyl alcohol is heated under reflux with stirring for 19 hours. The black precipitate of lead sulfide is removed by filtration and the alcohol is removed from the filtrate by evaporation. The residue is a viscous oil containing some solid material. It is purified by slurrying in a small amount of absolute alcohol and removing the white precipitate of slightly impure 1-phenyl-3-cyanoguanidine by filtration. This material is purified by recrystallization from absolute alcohol and the purified 1-phenyl-3-cyanoguanidine has a melting point of 189°–190° C.

By a similar procedure, 1-isopropyl-3-cyanoguanidine may be prepared and after purification it has a melting point of 102°–104° C. Also, by an analogous procedure 1-p-chlorophenyl-3-cyanoguanidine may be obtained and after purification it has a melting point of 205° C.

EXAMPLE 14

*1-dodecyl-2-phenyl-3-cyanoguanidine*

26.0 parts of lead cyanamide are added to a solution of 32.0 parts of N-dodecyl-N'-phenylthiourea in 200 parts of ethanol and stirred at the reflux temperature until a clarified test portion shows no discoloration after treatment with yellow mercuric oxide. The warm reaction mixture is filtered to remove the lead sulfide and the 1-dodecyl-2-phenyl-3-cyanoguanidine is recovered by diluting the alcoholic filtrate with water. After recrystallization from hexane, the product melts at 77.5°–79° C.

What is claimed is:

1. In the manufacture of N-organic substituted-3-cyanoguanidine compounds having the following formula:

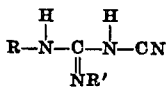

wherein R is selected from the class consisting of hydrocarbon and halo-aryl groups and R' is selected from the class consisting of hydrogen and hydrocarbon groups, the process which comprises reacting an N-organic substituted thiourea having the following formula:

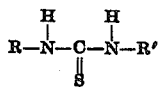

wherein R and R' are as defined above, with a member of the group consisting of (1) a metal salt of cyanamide selected from the group consisting of the mercury, lead, and silver salts thereof, and (2) cyanamide and an oxide of a metal chosen from the group consisting of mercury, lead, and silver, in an inert solvent, and recovering the corresponding N-organic substitute-3-cyanoguanidine compound so obtained.

2. The process of claim 1 wherein said thiourea compound is N-isopropyl thiourea.

3. The process of claim 1 wherein said thiourea compound is N-p-chlorophenyl thiourea.

4. The process of claim 1 wherein said thiourea compound is N-isopropyl-N'-p-chlorophenyl thiourea.

5. The process of claim 1 in which the inert solvent is an alcohol.

6. The process of claim 1 wherein said cyanamide salt is lead cyanamide.

7. A prcoess for the preparation of 1-isopropyl-3-cyanoguanidine which comprises reacting N-isopropyl thiourea with lead cyanamide in an inert solvent.

8. A process for the preparation of 1-p-chlorophenyl-3-cyanoguanidine which comprises reacting N-p-chlorophenyl thiourea with lead cyanamide in an inert solvent.

9. A process for the preparation of 1-isopropyl-2-p-chlorophenyl-3-cyanoguanidine which comprises reacting N-isopropyl-N'-p-chlorophenyl thiourea with lead cyanamide in an inert solvent.

HANS Z. LECHER.
ROBERT PRESCOTT PARKER.
ROBERT SIDNEY LONG.

No references cited.